(12) United States Patent
Bauer

(10) Patent No.: US 8,890,468 B2
(45) Date of Patent: Nov. 18, 2014

(54) PORTABLE POWER SUPPLY

(76) Inventor: Donald L. Bauer, Pollock Pines, CA (US)

( * ) Notice: Subject to any disclaimer, the term of this patent is extended or adjusted under 35 U.S.C. 154(b) by 277 days.

(21) Appl. No.: 13/107,597

(22) Filed: May 13, 2011

(65) Prior Publication Data

US 2011/0279090 A1    Nov. 17, 2011

Related U.S. Application Data

(60) Provisional application No. 61/334,971, filed on May 14, 2010.

(51) Int. Cl.
*H02J 7/00* (2006.01)
*H01R 31/06* (2006.01)

(52) U.S. Cl.
CPC .............. *H02J 7/0042* (2013.01); *H01R 31/06* (2013.01)
USPC ........................................................ 320/107

(58) Field of Classification Search
USPC .......................... 320/103, 110, 107, 112, 114
See application file for complete search history.

(56) References Cited

U.S. PATENT DOCUMENTS

| | | | | |
|---|---|---|---|---|
| 6,104,162 A * | 8/2000 | Sainsbury et al. | ............ | 320/111 |
| 6,495,988 B1 * | 12/2002 | Liao | ............... | 320/111 |
| 6,502,949 B1 * | 1/2003 | Horiyama et al. | ............ | 362/119 |
| 6,683,439 B2 * | 1/2004 | Takano et al. | ................. | 320/132 |
| 6,765,365 B2 * | 7/2004 | Kim et al. | ..................... | 320/112 |
| 6,876,173 B2 * | 4/2005 | Mastaler et al. | .............. | 320/114 |
| 6,977,479 B2 * | 12/2005 | Hsu | ............................... | 320/101 |
| 7,443,137 B2 * | 10/2008 | Scott et al. | .................... | 320/114 |
| 7,893,657 B2 * | 2/2011 | Chavakula | .................... | 320/138 |
| 2005/0285562 A1 * | 12/2005 | Wu | ................................ | 320/111 |
| 2006/0097692 A1 * | 5/2006 | Chen et al. | .................... | 320/107 |
| 2007/0182368 A1 * | 8/2007 | Yang | .............................. | 320/110 |
| 2008/0238356 A1 * | 10/2008 | Batson et al. | ................. | 320/103 |

\* cited by examiner

*Primary Examiner* — Richard V Muralidar

(57) ABSTRACT

A portable power system for handheld battery-powered device comprises a power source containing a universal, non OEM battery, a power cord connected to the power source forming an electrical connection, and a battery connection adaptor, connected to the power cord, configured to be electrically connected to the handheld battery powered device, permitting users to replace the original equipment battery with a universal battery that can accommodate any similar voltage DC powered handheld device from any manufacturer.

1 Claim, 4 Drawing Sheets

BATTERY REPLACEMENT ADAPTOR
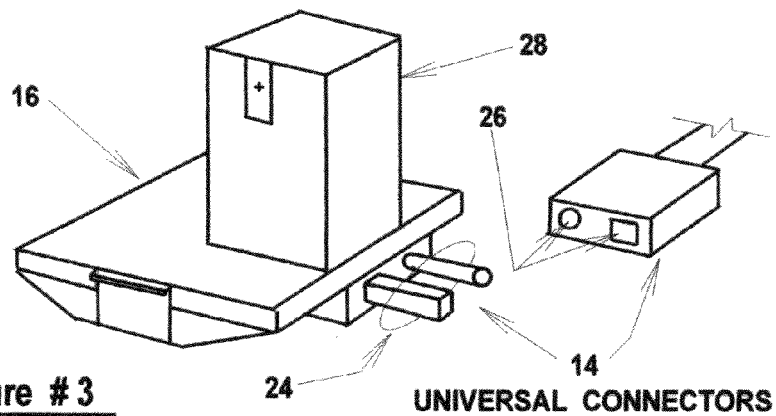
Figure #3
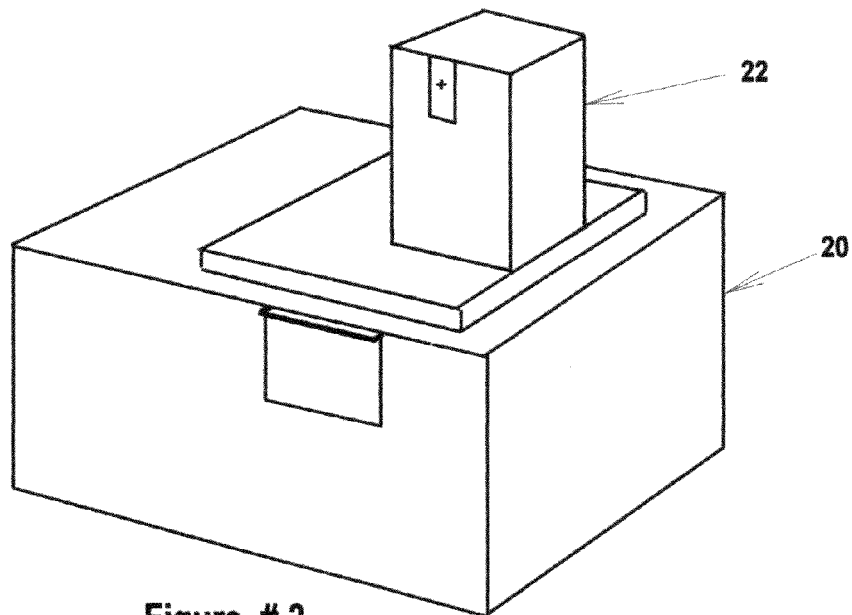
Figure #2
TYPICAL BATTERY (Ex. 18V)
Approx. 3" x 5" x 2" w/o connector riser
Approx. 2 Lbs.

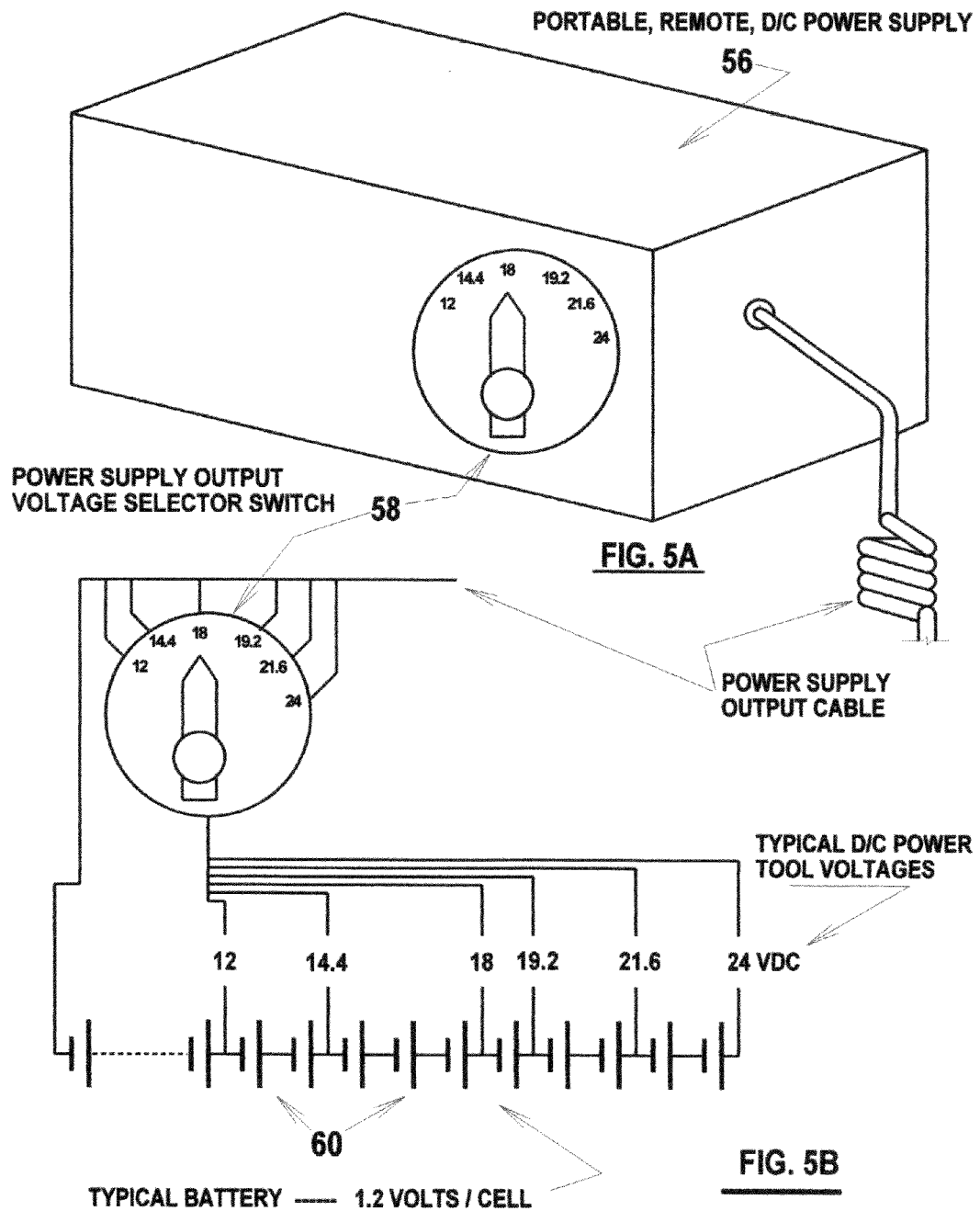

PORTABLE POWER SUPPLY

CROSS REFERENCE TO RELATED APPLICATIONS

This application claims priority pursuant to 35 USC Section 119 (e) to the U.S. patent application Ser. No. 61/334,971, filed May 14, 2010.

STATEMENT REGARDING FEDERALLY SPONSORED RESEARCH/DEVELOPMENT

None

REFERENCE TO MICROFICHE APPENDIX

None

1. FIELD OF THE INVENTION

The present invention relates to portable power supplies and, more particularly to battery packs for battery powered hand tools.

2. BACKGROUND OF THE INVENTION

Portable powered hand tools, of the general category, Drill Motors, Saws, Sanders, Nailers, Lawn and Hedge Trimmers, and many other tools of the craftsman and homeowner, are typically powered by attached batteries of many varieties and voltages. Each tool must be powered by its own battery or a battery exchanged from another tool with identical power geometry.

The new, higher voltage batteries, approximately 12 volts and above, are large and very heavy. Since each tool must have an attached battery, users doing repetitive tasks, i.e., drywall installation, deck construction, commercial remodeling, etc., must lift and support this heavy battery hundreds of times each day. Lifting, holding, steadying, using and returning the tool to its carrier so many times each day is extremely strenuous. People of smaller stature often find battery powered tools too heavy for any comfortable use.

Currently, each battery is unique to the manufacturer, voltage and tool family. Each battery is charged by a unique charger designed for that battery style only. Recently, an adapter system for battery-powered tools has been introduced where the original equipment (OEM) rechargeable battery is removed from the tool and carried separately by the user and was described in U.S. Pat. No. 7,629,766 (Sadow. 2009). However, this system does not allow the user to upgrade to better or different batteries with greater capacities, more efficient charging profiles, better power sources and one that can accommodate any similar voltage DC powered device from any manufacturer.

It can be seen, then, that there is a need in the art for a portable power supply that can replace the heavy battery from the tool and relocate it to user's belt or to a shoulder sling. It can also be seen that there is a need in, the art for a portable power supply that allows the user to replace the original equipment rechargeable battery with a universal power supply that can power any similar voltage DC powered device from any manufacturer.

3. SUMMARY OF INVENTION

The subject invention removes the heavy battery from the tool and replaces it with a universal power supply that may be a battery that can power any similar voltage DC powered tool from any manufacturer and relocates it to the user's tool belt or to a shoulder sling where it will be nearly unnoticed. Power is delivered from the battery to the powered tool through a light weight, coiled, retractile cable, with an easily disconnected universal plug connector. Each battery powered tool is equipped with a simple, light weight adaptor, which replaces the battery and connects to the universal plug connector.

Therefore, one universal battery or power supply can power any similar voltage DC powered tool from any manufacturer. With only one battery style only one charger style would be necessary. No more multiple batteries or multiple chargers with which to contend. Each battery powered tool model from each manufacturer would be provided a small, light-weight adaptor which would resemble the connection section only of its normal battery, but would not include the bulky cell container portion, or the heavy battery cells. This adaptor would include a universal plug connector to receive power from an external source.

Each universal battery pack would be housed in a small container suitable for any style carrying attachment (belt loop, shoulder sling, tool pouch, etc). Each battery pack would include a light-weight, easily extended, coiled, retractile power cable (approximately one foot long retracted, four feet long extended) terminated at the tool end with a universal plug connector. Therefore, all universal batteries with universal plug connectors would connect to all battery powered tool adaptors. Similar voltage keying would be necessary.

With only one battery style for each voltage, a matching single style charger with a more efficient (programmed) charging profile could be justified, thereby providing, a higher capacity, longer lasting charge than current standard; closer to full charge rather than near 70% now normal. Programmed charging could also extend battery life. It is also possible that tools normally powered at different DC voltage levels, i.e. 12 VDC and 14.4 VDC, can all be powered at one voltage; in this example, both powered at 14.4 VDC as one manufacturer has previously allowed.

With the battery housed in a separate container and connected by a universal connector, upgrading to better batteries, larger capacity batteries, or better power sources (lithium ion cells, fuel cells, nanotechnology incorporation, etc.) is a simple step. As new DC power source developments become available, simply provide the new source with the universal connector. The powered tool would be unchanged.

Eliminating the cumulative weight moved each day by the craftsman by relocating the battery weight to the tool belt, is a significant ergonomic and safety improvement. The present circumstance where DC powered tools are perfectly workable but outdated batteries are discontinued and unavailable would be avoided. Universal batteries with universal connector plugs would eliminate the need to restyle batteries for each powered tool restyle.

Higher voltage, higher powered portable hand tools, now basically limited by battery weight, could be developed since battery weight would not be included in the tool but would be carried on the craftsman's tool belt and not be a limiting factor. Environmental temperature effects on exposed batteries, which are seriously degrading at low temperatures, can be easily minimized when the battery is carried separate from the battery powered tool in a protective tool pouch.

High capacity, economical, universal battery packs, should promote adaptation to DC power of a number of today's manual or A/C powered devices, including: gardening tools, household cleaning devices, hobby tools, toys, and more. Moreover, incorporation of a universal connector on many of todays DC powered portable technology items, i.e., computers, printers, electronic games, mobile movie viewers, etc., would allow these battery packs to act as back-up or as an alternative power source.

For special applications, a single battery pack could provide several voltage levels through external plugging configurations or a switched output selection from a power supply with alternative voltage outputs. Two on more battery packs could be easily connected in parallel to provide longer operating times between battery replacements/charges.

Longer or series-connecting retractile extension cables could be provided when battery powered tools are used at fixed locations, where the battery is not carried but rests on a work bench or other convenient surface, and greater mobility (longer reach) is required. For workbench or other fixed location application of DC powered tools, the battery source could be replaced with a rectified 120V AC source for unlimited time use.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are, not intended as a definition of the limits of the invention.

4. BRIEF DESCRIPTION OF THE DRAWINGS

FIG. 2 is a perspective view of an idealized battery;

FIG. 3 is an idealized view of a universal connector;

FIG. 5, including FIGS. 5A and 5B show a multi-voltage power supply.

5. DETAILED DESCRIPTION OF THE DRAWINGS

Figure 1:
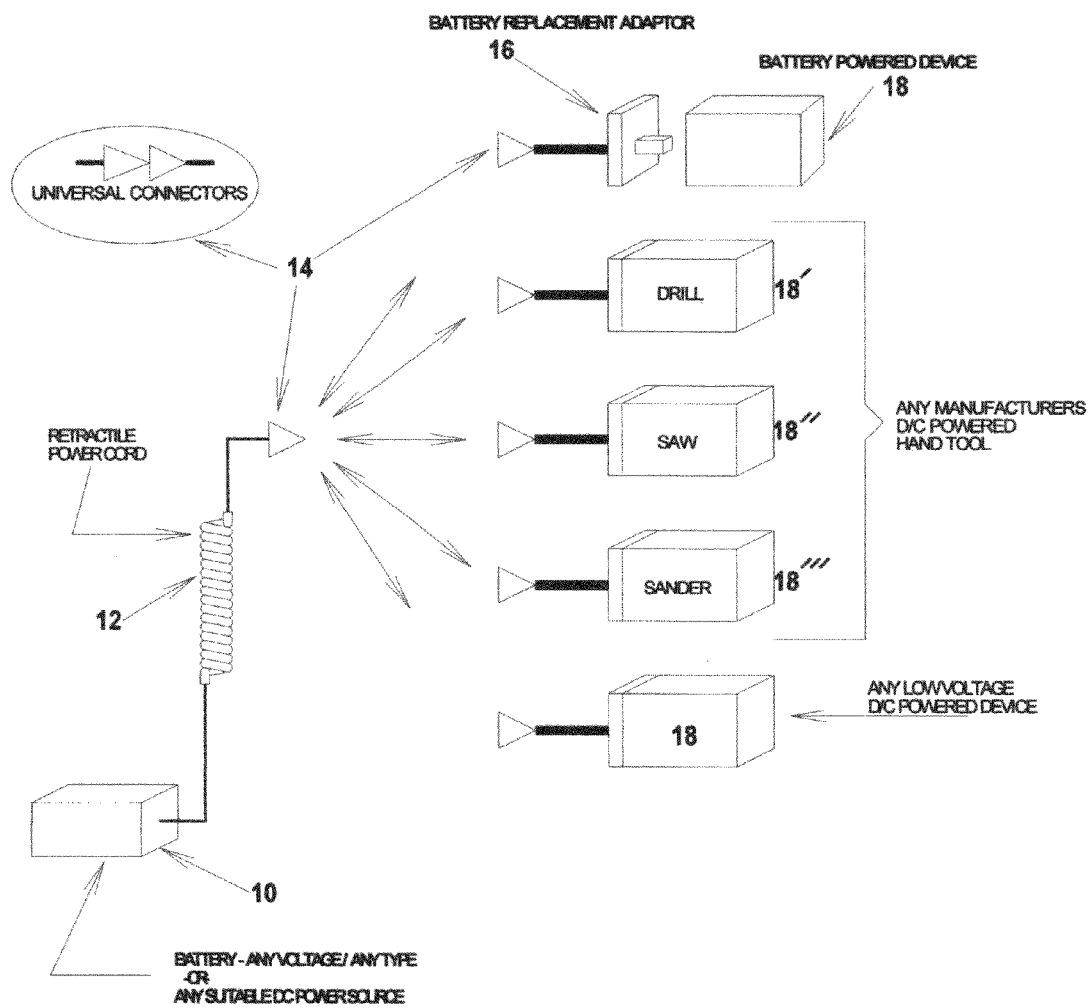
FIG. 1 is a block diagram of a preferred embodiment of the present invention in which a plurality of powered devices are shown.

Turning first to FIG. 1, there is shown a preferred embodiment of the present invention. A typical battery 10 is connected through a retractable or retractile power cord 12 to a universal connector 14. The universal connector is adapted to be connected to a battery replacement adapter 16 which is designed to connect to the battery receiving terminals of a battery powered device 18.

As shown in FIG. 1, the battery powered device can alternatively be a drill motor 18', a saw 18" or a sander 18'". Blocks are indicative of numerous other powered devices that could be employed with the present invention.

In FIG. 2, a typical battery 10 is shown in greater detail. As shown, there is the battery body 20 and a coupling member 22 which is adapted to mate with a complementary socket (not shown) on a power tool. As each device manufacturer provides unique connections between tool and battery, it is necessary to duplicate each coupling member 22 when creating a suitable battery replacement adapter 16.

FIG. 3 shows a battery replacement adapter 16 and the terminals 24 which are adapted to fit into sockets 26 of the universal connector 14. A suitable coupling element 28 is substantially identical to the coupling element 22 of battery 20 so that it can fit into the appropriated socket of the tool 18. As seen in FIG. 1, the universal connector 14 is coupled to the coiled, retractile, power supply cord 12. This cord 12 is light weight, flexible, and, in the preferred embodiment, easily extends and retracts between one and four feet.

The universal connector 14 would be a simple DC, low voltage coupling device which could easily be disconnected or connected. Preferably, it is mechanically keyed to allow coupling of specific voltage levels only. Various pin configurations would be used to allow a plurality of different voltages. The battery replacement adaptor 16 would accept one (or two when permitted) voltage levels but would adapt all similar battery geometry tools and other DC powered devices of this manufacturer to a single, independent power supply.

Figure 4:
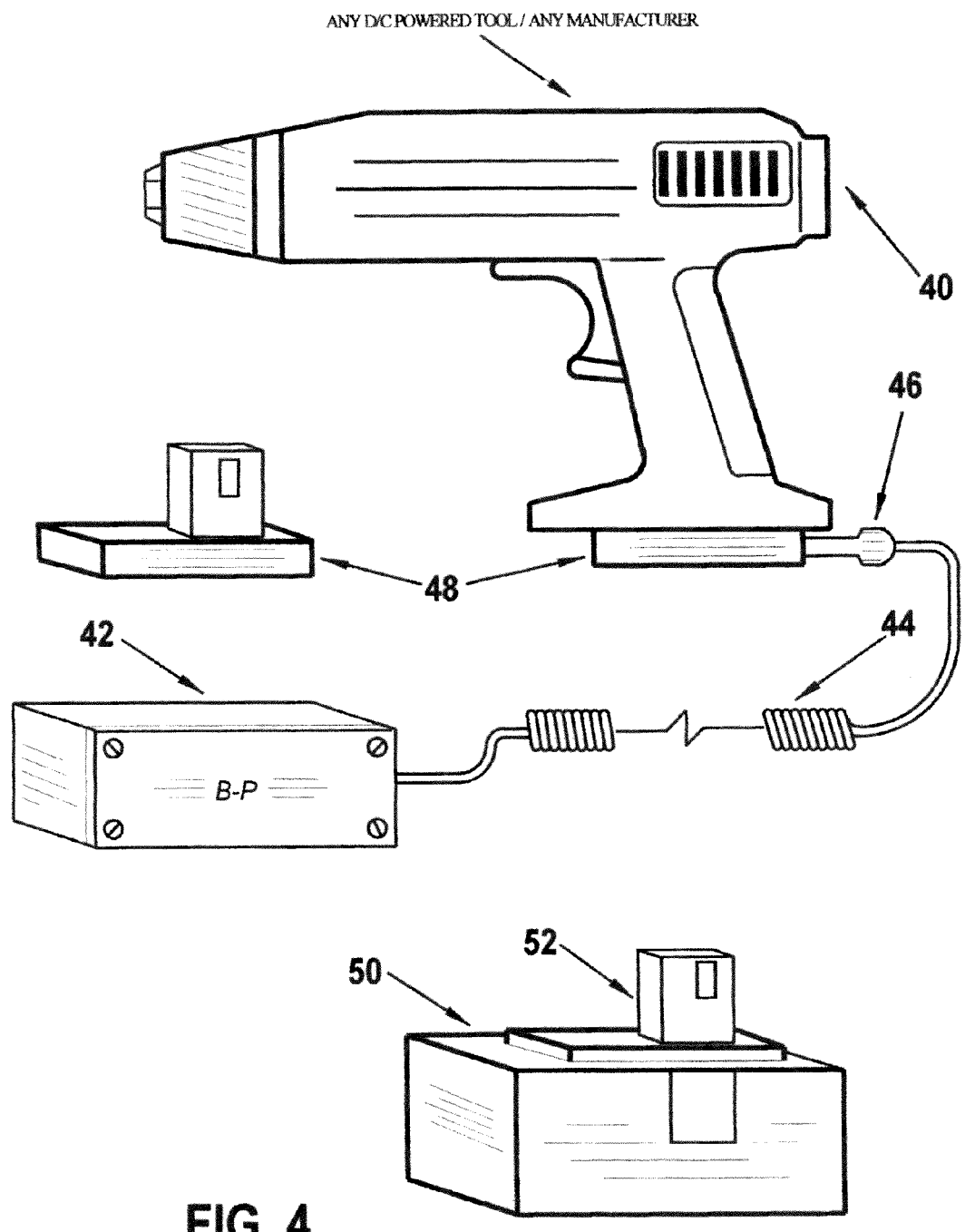
FIG. 4 is an idealized view of a power tool connected to the present invention.

Turning now to FIG. 4, there is shown a power tool 40 connected to a remote power supply 42 through a coiled retractile cable 44 which ends in a universal connector 46 that plugs into a battery adapter 48 already attached to the power tool 40. The conventional battery 50 that is being replaced is shown adjacent the power tool 40. The battery adapter 48 has the configuration of that portion 52 of the battery 50 that would normally be connected to the tool 40.

Other configurations could be envisioned that lighten the hand held power tool by removing the weight of the battery that powers the tool. The remote power supply 42 can be belt mounted and worn at the waist or can be carried in a back pack or sling and supported by the shoulder. As noted above, a similar but mobile variation of an unlimited time model would include a corded AC source rectified to DC through a portable AC-DC inverter.

Turning next to FIG. 5 which includes FIGS. 5A and 5B. In FIG. 5A there is shown a multi-voltage power supply 56 with a selector switch 58 that permits a range of output, voltages. FIG. 5B shows one configuration of such a device and includes a plurality of DC battery cells 60. In the present example, each cell has a voltage output of 1.2 volts. Using the switch 58, outputs varying from 12 volts to 24 volts can be chosen by tapping the battery at the appropriate cell 60.

Thus, there has been shown an alternative power source for battery powered devices that alleviates some of the weight burden of hand held devices that are in use for over long periods of time. Removing the battery, substantially lightens the load that frequently must be held in an extended arm, permitting a more comfortable work environment. Other variations and alternatives will appear to those skilled in the art.

I claim:

1. A light-weight portable power supply for a plurality of different types of power tools, said light-weight portable power supply consisting of:

a battery-carrying pouch for carrying a removable power source, said removable power source being one of a single rechargeable battery, two rechargeable batteries connected in parallel, or a fuel cell;

said battery-carrying pouch containing no battery charger circuitry;

a plurality of adapters designed to interface with an existing battery interface of said plurality of different types of power tools;

each of said plurality of adapters being small and lightweight, and each consisting of a dc connector on one side, and terminal contacts on another side for through-putting a dc power to the existing interface of said plurality of different types of power tools, each of said plurality of adapters designed to interface with one type of power tool from among the plurality of different types of power tools, each of said plurality of adapters containing no electronics; and a short, coiled cable with a dc plug that connects the battery-carrying pouch to said dc connector of one of said plurality of adapters, for supplying said dc power from said battery-carrying pouch to one of said different types of power tools when in use.

* * * * *